US005799301A

United States Patent [19]
Castelli et al.

[11] Patent Number: 5,799,301
[45] Date of Patent: Aug. 25, 1998

[54] APPARATUS AND METHOD FOR PERFORMING ADAPTIVE SIMILARITY SEARCHING IN A SEQUENCE DATABASE

[75] Inventors: Vittorio Castelli, White Plains; Chung Sheng Li, Ossining; Philip Shi-Lung Yu, Chappaqua, all of N.Y.

[73] Assignee: International Business Machines Corporation, Armonk, N.Y.

[21] Appl. No.: 513,583

[22] Filed: Aug. 10, 1995

[51] Int. Cl.⁶ .................................................. G06F 17/30
[52] U.S. Cl. ........................... 707/6; 707/3; 707/5
[58] Field of Search ........................... 395/606, 611, 395/600, 25; 707/6, 3, 5; 364/724.11, 724.011, 728.03

[56] References Cited

U.S. PATENT DOCUMENTS

| | | | |
|---|---|---|---|
| 4,598,385 | 7/1986 | Kessels | 707/3 |
| 4,700,294 | 10/1987 | Haynes | 341/106 |
| 5,049,881 | 9/1991 | Gibson et al. | 341/95 |
| 5,133,052 | 7/1992 | Bier et al. | 707/350 |
| 5,317,730 | 5/1994 | Moore et al. | 707/100 |
| 5,432,902 | 7/1995 | Matsumoto | 345/338 |
| 5,438,628 | 8/1995 | Spitz et al. | 382/181 |
| 5,450,504 | 9/1995 | Calia | 382/118 |
| 5,485,611 | 1/1996 | Astle | 395/600 |
| 5,497,486 | 3/1996 | Stolfo et al. | 382/283 |
| 5,524,240 | 6/1996 | Barbara et al. | 707/3 |
| 5,537,586 | 7/1996 | Amram et al. | 707/3 |
| 5,546,575 | 8/1996 | Potter et al. | 395/600 |
| 5,548,755 | 8/1996 | Leung et al. | 395/600 |
| 5,577,249 | 11/1996 | Califano | 395/611 |
| 5,614,927 | 3/1997 | Gifford et al. | 707/531 |
| 5,631,972 | 5/1997 | Ferris et al. | 382/125 |
| 5,668,897 | 9/1997 | Stolfo | 382/283 |
| 5,684,999 | 11/1997 | Okamoto | 704/9 |
| 5,687,190 | 11/1997 | Tsao | 375/206 |
| 5,706,498 | 1/1998 | Fujimiya et al. | 364/497 |
| 5,710,833 | 1/1998 | Moghaddam et al. | 382/228 |

OTHER PUBLICATIONS

Agrawal et al, Database mining: A Performance Perspective, IEEE, pp. 914–925, Dec. 1993.
Beckmann et al, The R*–tree: An Efficient and Robus Access Method for Points and Rectangles, Praktische Informatick, pp. 322–332, 1990.
Agrawal et al, Efficient Similarity Search in Sequence Datbases, IBM, pp. 1–16, Mar. 1994.
Saridis et al, Analytic Formulation of Intelligent Machines as Neural Networks, IEEE, pp. 22–27, Dec. 1989.

*Primary Examiner*—Thomas G. Black
*Assistant Examiner*—Frantz Coby
*Attorney, Agent, or Firm*—Richard M. Ludwin

[57] ABSTRACT

An apparatus and method includes segmenting each sequence to be stored in a database into nonoverlapping or minimally overlapping subsequences with equal length. Each subsequence is then normalized using a normalization procedure (such as normalized with respect to the energy or maximum amplitude of each sequence) and transformed into a series of coefficients in a feature space. The search is based on hierarchical correlation in the feature space between the target sequence with the subsequences. The correlation between the target sequence and the stored sequences is performed first at the lowest level in the hierarchy. At any given level, a match is declared when the correlated result is larger than a specific threshold. Sequences that fail to satisfy the matching criterion are discarded. The process is continued at the following level until the highest level is reached. Because of the hierarchical search, linear scan of the entire sequence can be avoided.

9 Claims, 4 Drawing Sheets

APPARATUS AND METHOD FOR PERFORMING ADAPTIVE SIMILARITY SEARCHING IN A SEQUENCE DATABASE

FIELD OF THE INVENTION

The present invention relates to an information handling system and, more particularly, to an efficient technique for performing phenomena search and for retrieving similar sequences from a sequence database in a client/server information handling system.

PRIOR ART

Temporal or spatial-temporal data constitutes a large portion of data stored in computers. Several new emerging applications, such as identification of companies with similar patterns of growth, determining products with similar selling patterns, and discovering stocks with similar price movement, in various business-related areas and identification of specific weather patterns, identification of specific geological features, identification of specific environmental pollutions, and identification of astrophysics patterns in various scientific areas require similarity matches as opposed to exact matches.

Much of the prior art has focused on exact queries.

One example of a prior art search technique is described in an article entitled "Efficient Similarity Search in Sequence Database," by Agrawal et al., published in Fourth International Conference on Foundations of Data Organization and Algorithms, Chicago, 1993. The article describes a fast-searching method to perform similarity match based on the computation of the mean square error of the first few Fourier coefficient of two sequences. However, this method does not address the issue related to scaling and possible phase difference between two sequences.

Another prior art method has been proposed to match subsequences by generating the first few Fourier coefficients of all possible subsequences of a given length for each sequence in the database. The two-Fourier-coefficient representation of each subsequences can be viewed as a point in two-dimensional feature space. The locations of several points in the Fourier domain, each of which corresponds to a subsequence, can be combined and approximately represented by a rectangle, thus reducing the overall requirement on storage space. This method neither solves the scaling problem nor retains sufficient information in the feature space and can thus cause a significant number of false alarms.

SUMMARY OF THE INVENTION

It is a primary object of the present invention to construct a database that allows similarity matches which are insensitive to the possible scale and phase differences between the stored and the test series. Furthermore, many more features from the original temporal and/or spatio-temporal sequences are retained, thus reducing the possibility of false alarms.

Accordingly, an apparatus and a method includes segmenting each sequence to be stored in the database into nonoverlapping or minimally overlapping subsequences with equal length; each subsequence is then normalized using a normalization procedure (for instance, with respect to the energy or to the maximum amplitude) and transformed into a series of coefficients in the feature space. The search is based on a combination of indexing and hierarchical correlation in the feature space between the target sequence and the subsequences. Indexing in the feature space is performed at first to prune the search space and terminates when the search space does not decrease any further. Correlation is then performed between the target sequence and the search space. The correlation between the target sequence and the sequences in the search space is performed first at the lowest level in the hierarchy. At any given level, a match is declared when the correlated result is larger than a specific threshold. Sequences that fail to satisfy the matching criterion are discarded. The process is continued at the following level until the highest level is reached. Because of the hierarchical search, linear scan of the entire sequence can be avoided.

The foregoing has outlined the features and advantages of the present invention so that the detailed description of a preferred embodiment of the invention, which follows, may be better understood.

BRIEF DESCRIPTION OF THE DRAWINGS

For a more complete understanding of the present invention, and the features and advantages thereof, reference is made to the detailed description of embodiments of the invention in conjunction with the accompanying drawing in which.

DETAILED DESCRIPTION OF A PREFERRED EMBODIMENT OF THE INVENTION

Figure 1:
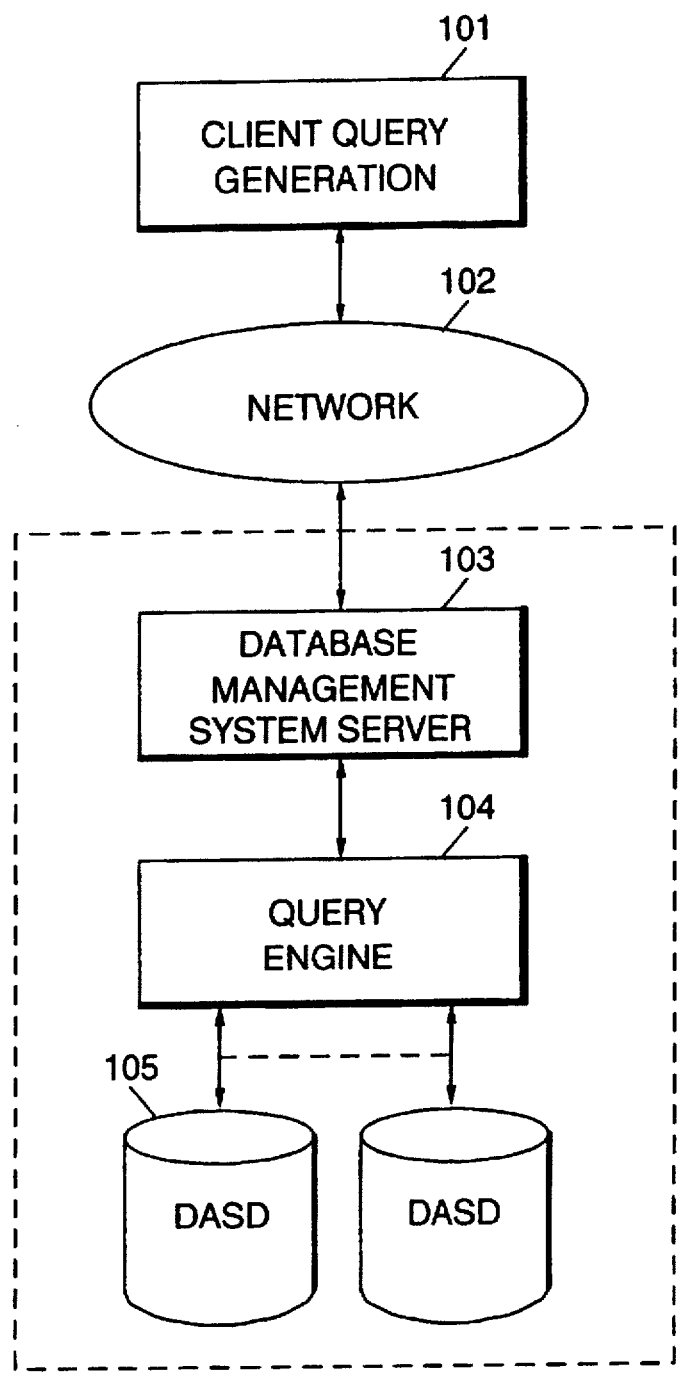
FIG. 1 is a block diagram of a system illustrating a database management system server serving queries issued from clients through a network according to the present invention.

A database management system that incorporates the capability of performing similarity matches as a possible data mining operation in accordance with the present invention is shown in FIG. 1. A user issues a query from a client system (101) through a network (102) to a database management system server (103) (DBMSS). Note that in such a client/server environment, multiple clients and servers can be configured so that the data in the database is either partitioned or replicated among database management servers. The query is then processed by the query engine (104). The query engine searches the database stored on DASD (105) (direct access storage devices) attached to the system according to the search criteria specified by or generated from the query. The query results are then transmitted back to the client through the network.

Figure 2:
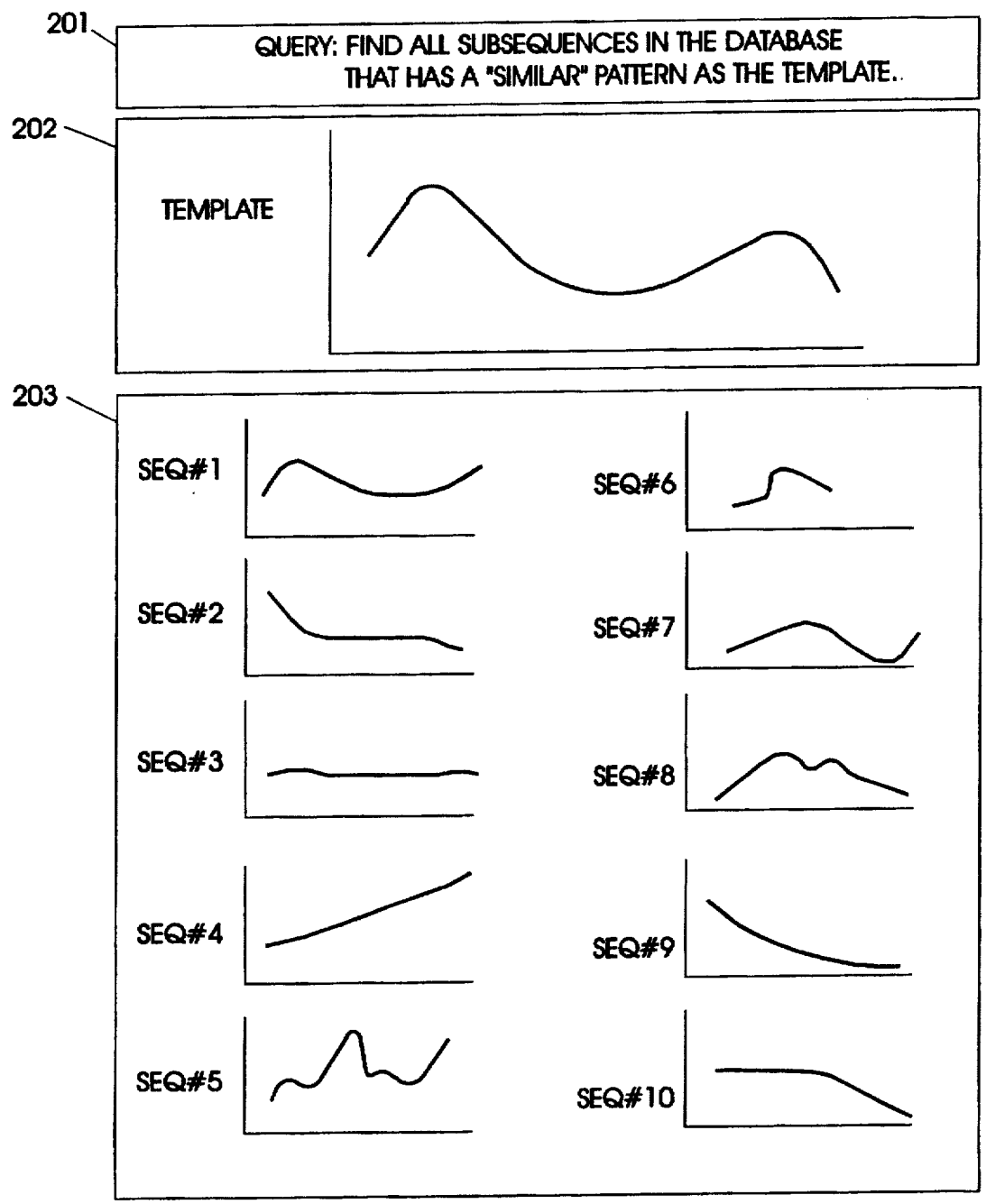
FIG. 2 is an example of a process of performing template matching in data mining operation in accordance with the present invention.

FIG. 2 shows a specific example of the similarity search process. There are 10 time sequences (203) stored in the database (105) in FIG. 1. Each time sequence could represent the stock price fluctuations, quarterly sales volume, or the bond yield. A query (201) issued by a client (101) could be to search and find those sequences with a trend similar to that of a template (202).

The indexing process of the present invention consists of two parts. The first part is indexing in the feature space. The implementation of the indexing can be those taught in the prior art such as R-tree indexing. However, the indexing process terminates when any one of the following conditions occur:

(1) There are too many multipaths search (which would occur in R$^+$-tree);

(2) The pruning due to each additional level of traversing is not effective (which could occur in R*-tree).

Both R$^+$-tree and R*-tree are taught, for example, in "The R*-tree: an efficient and robust access method for points and rectangles," by N. Beckmann et al. in *Proceeding of ACM SIGMOD*, pp. 322–331, 1990. A threshold can be set up for detecting the existence of each condition.

Figure 3:
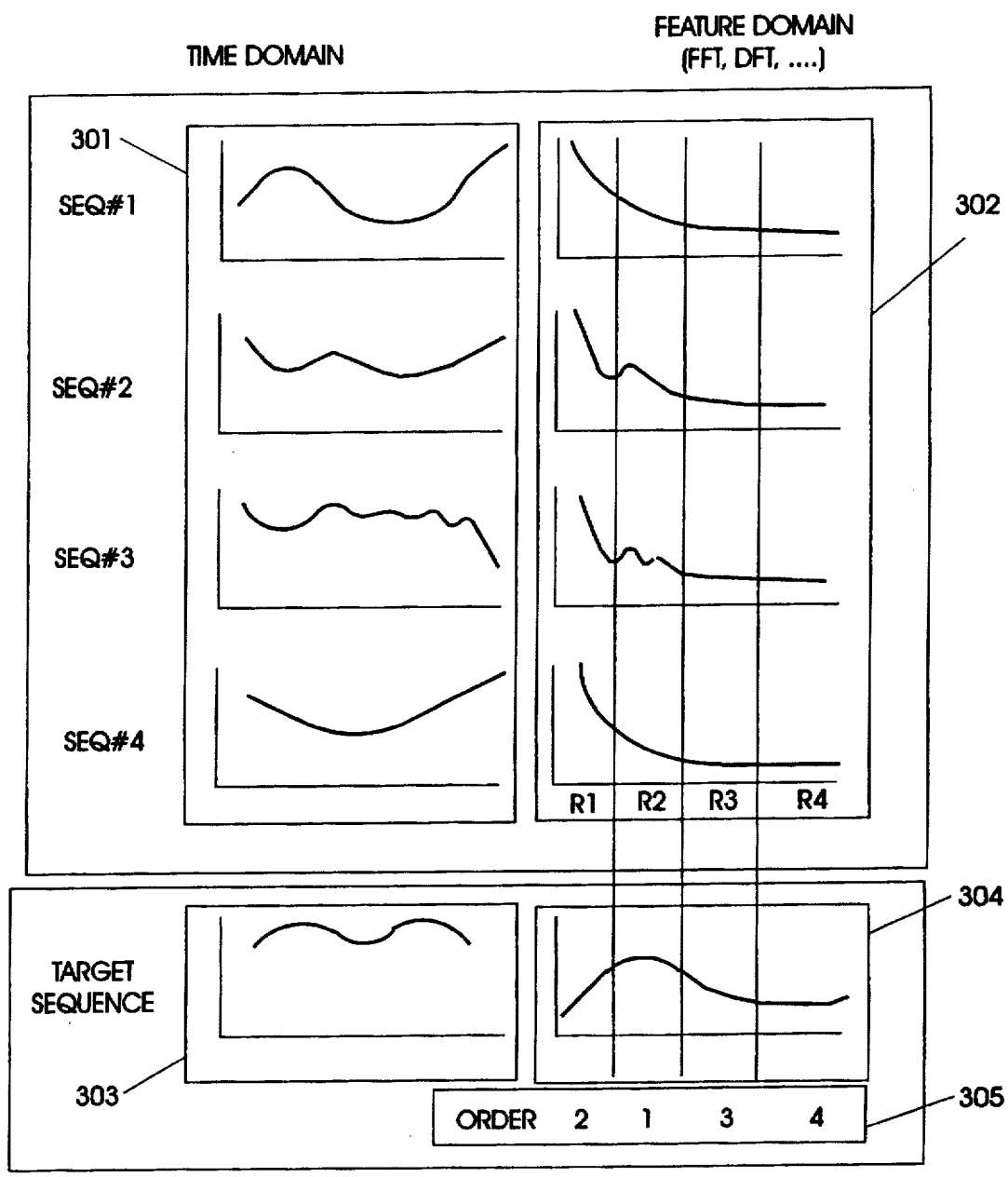
FIG. 3 illustrates an example of the representation of four sequences in their feature space in accordance with the present invention.

The result of the indexing is a much reduced set of sequences. A hierarchical correlation is then performed on the stored set of sequences produced by the indexing process, as shown in FIG. 3. DBMSS 103 controls the storage of four sequences (301) and their corresponding transformed coefficients (302). The template specified by query 201 indicates a target sequence (303) to be matched against. The first step is thus to transform the target sequence 303 into the feature space 302 with the same transformation methods used for transforming the other sequences in the database. This step will generate a set of coefficients in the feature space (304). The feature space has been divided into K (K=4 in this example) regions. The hierarchical correlation is performed first on the region of the feature space that ensures the highest discrimination. In this example, the order of the regions (305) used in query 201 is 2, 1, 3, 4, based on the computation of the histogram of the distribution of the coefficients. The first region used in query 201 has the highest number of large coefficients. Hence, the hierarchical correlation process can be adaptively modified using the target sequence.

This process is explained in further detail below.

(1) Definitions:

The similarity measure proposed in this invention is defined as follows:

Let $\{x_i\}$ and $\{y_i\}$ be the two series to be compared, let n be the length of $\{x_i\}$, N be the length of $\{y_i\}$, and without loss of generality that $n \leq N$. We shall later relax the last assumption.

The metric for measuring the similarity between $\{x_i\}$ and $\{y_i\}$ is $$\min_{j} \sum_{1}^{n} (x_i - C_j z_i^j)^2 \qquad (1)$$

where J is the J$^{th}$ possible subsequence, $C_j$ is a scaling constant and $z^J_i$ is the J$^{th}$ possible subsequence of $y_i$, defined as $$z_i^J = y_{mi+k} \qquad (2)$$

where m is the sampling period and k is the initial sampling delay. Here we have limited the discussion to uniformly sampled sequences $\{z'_i\}$ from $\{y_i\}$ with a possible phase adjustment k. However, its generalization to nonuniform sampling is straightforward.

In the proposed sequence matching algorithm, each stored sequence $\{y_i\}$ is represented by $\{Y_k\}$, the Fourier coefficients of $\{y_i\}$ where k=1..K and K≦N. The value of K is determined empirically.

Fourier transformation is adopted in the preferred embodiment, even though other transformation methods such as discrete cosine transform and discrete wavelet transform can also be used.

In the following, major components of the matching technique are described.

Figure 4:
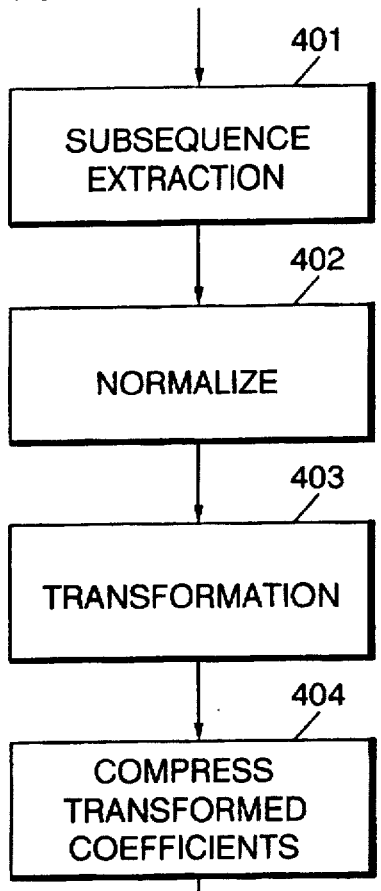
FIG. 4 is a flow chart of an index construction program in accordance with the present invention.

(1) Index Construction Process (FIG. 4)

The first step (401) in the index construction process is to extract the subsequences from a long sequence. A sliding window is used to slice a long data series into subseries before they are analyzed. There are two parameters for the movement of the sliding window:

1. size of the window, and
2. increments (i.e., sliding steps) of the window.

The use of a sliding window to generate versions of the sequences $\{y_{i,1}\}, \ldots, \{y_{i,L}\}$ from the original sequence $\{y_i\}$ removes the boundary effects during slicing a long stream of data into several subseries, at the expense of increasing the redundancy of the data storage. If the window size is M and the window moves at increments of $\alpha M$, then the redundancy is $1/\alpha$. If $\alpha$ equals 1, the redundancy equals 1 and there is no overlap of data between adjacent windows. This windowing operation is essential for performing phase-independent similarity match. Metadata is computed for each subsequence extracted in step 401. The metadata includes, but is not limited to, the length, the slope, first and higher order statistics of the subsequence, as well as the parameters used in normalization step 402. The computation of metadata is well known in the art, and is done for efficiency reasons.

The second step (402) is to normalize the sliced series $\{y_{i,j}\}$ of length N, thus generating a new series $\{\bar{y}_{i,j}\}$ of unit energy, $$\bar{y}_{i,j} = \frac{1}{\sqrt{E}} y_{i,j} \qquad (3)$$

where the energy E of a series is defined as $$E = \sum_{i=1}^{N} y_{i,j}^2 \qquad (4)$$

The third step (403) is to apply an orthonormal transformation to the normalized sequences.

The Fourier coefficients $\{Y_{i,j}\}$ of the normalized sequence $\{\bar{y}_{i,j}\}$ are computed from (2). The length of the resulting set of coefficients $\{Y_{i,j}\}$ is equal to the length of the original normalized sliced sequence $\{y_{i,j}\}$.

The transformed coefficients can be regrouped into non-intersecting subsets and subsequently compressed using various lossless compression techniques (104) such as run-length coding, huffman coding, or lossy compressing techniques (vector quantization, etc.).

(2) Grouping of Coefficients

After the Fourier coefficients $\{Y_{i,j}\}$ are computed for each normalized sliced sequence $\{y_{i,j}\}$, the coefficients are segmented into nonoverlapped groups either (a) during the index construction time or (b) at the indexing time. For some other transformation techniques such as subband coding and discrete wavelet transformation, the grouping is determined at the index construction time.

After partitioning of the Fourier coefficients $\{Y_{i,j}\}$ into P nonoverlapping groups, the i$^{th}$ coefficients within the p$^{th}$ group is $$Y_{i,j}^p = Y_{pQ+i,j} \qquad (5)$$

where Q is the number of coefficients within each group. The size of each group is designed so that the speed of the correlation process is maximized. The following is an example of a procedure to partition the feature space for efficient searching.

Select from the database (for instance, at random) a group of sequences, and call it the training set S. Construct a set of test subsequences V. Let the feature space be the space of Fourier coefficients of the sequences. Order the coefficients according to their natural ordering. Assume a model for noise (for instance, additive white Gaussian noise or AWGN) and fix a signal to noise ratio (SNR).

Now define a threshold T(n) and two functions $f_1(n)$ and $f_2(n,T)$ as follows:

Let T(n) be the minimum value of the threshold that ensures that the matching algorithm based on the first n features does not reject a matching sequence when the noise is of the defined type and the SNR is less than or equal to the fixed value.

Let $f_1(n)$ be the computational cost of using the first n Fourier coefficients in the search.

Let $f_2(n,T)$ be a measure of the selectivity of the matching algorithm, for instance, the percentage of sequences that are rejected as a function of the number of features used and of the threshold T(n).

In general, $f_1(n)$ is an increasing function of n (possibly convex), while $f_2(n,T)$ is a nonincreasing function of n for every fixed value of the SNR.

The function $f_1(n)$ can be determined a-priori, given the algorithm used for the subsequence matching and the architecture of the computer. The threshold T(n) can be determined experimentally using the test set V and artificially generated noise. Once T(n) is fixed, the function $f_2(n,T)$ can be empirically determined by means of the training set S and the test set V.

A cost function, for instance $c(n)=f_1(n)+(1+r)f_2(n,T)$ is defined and a value of n that minimizes it is found. Again, note that both $f_2$ and T are estimated from the training and test sets.

Once n is fixed, the selection process can be iteratively repeated on the feature not yet used. Also, the training set is iteratively modified to contain only the sequences that we accepted during the previous stage.

Figure 5:
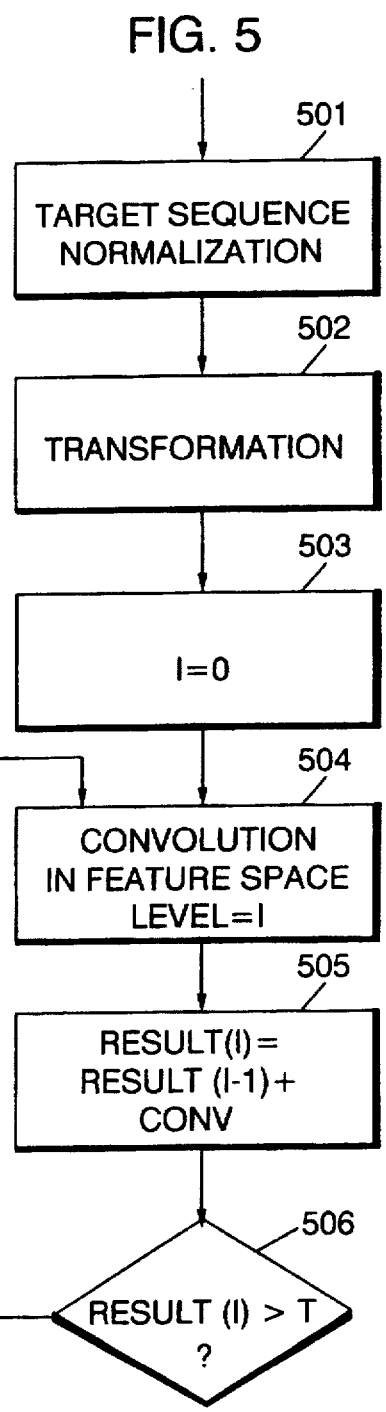
FIG. 5 is a flow chart of an indexing process in accordance with the present invention.

(3) Matching Process (FIG. 5)

The process of matching a temporal or a spatio-temporal database is shown in FIG. 5 and discussed below.

The first step (501) is to normalize the target sequence $\{x_i\}$ using the same normalization procedure as in the index construction process. If the length of the target sequence is smaller than the length of a segment, the target sequence $\{x_i\}$ is padded with zeros by setting $x_i=0$ for $i=n+1 \ldots N+n-1$.

The Fourier coefficients (or the features in the generic feature space) are obtained (502) by computing $$X_i = Fourier\{x_i\} \tag{6}$$

The hierarchical correlation (504) consists of computing the correlation between $\{x_i\}$ and $\{y^n{}_i\}$ starting from level 0 (503) as follows:

$$CORR_i^0 = X_i^0 Y_i^0 \tag{7}$$

The $i^{th}$ level is related to the $p^{th}$ group through a mapping function $i=f(p)$ where the mapping function $f(.)$, the order in which the correlation coefficients are computed, is designed so that the distinction capability of the correlation between the target sequence and the stored sequence is maximized at each level (and yields maximum filtering capability). This could be achieved by either of the following two techniques:

1. compute the total energy within each group and order the relative importance of each group by the total energy of each group, or 2. compute the variance (or entropy) of each group and order the groups according to their variance.

The correlation results at $j^{th}$ level is the sum of the correlation at level j-1 or the new correlation, $X^j{}_i Y^j{}_i$ $$CORR_i^j = CORR_i^{j-1} + X_i^j Y_i^j \tag{8}$$

The similarity measure is the maximum value of the correlation at each level i, obtained by computing the inverse Fourier transform of C O R $R^j{}_i$ at each level j $$corr_i = Fourier^{-1}\{CORR_i\} \tag{9}$$

Thus, the final measure is $$S = max\{corr_i\} \tag{10}$$

A sequence is discarded (506) if the correlation result is less than a threshold. As a result of the described process, many sequences in the database that do not present similarity with the test sequence, in the sense of the metric defined in Eq. (1), can be quickly discarded at each level of the hierarchical search, thus reducing the overall computation requirements.

Now that the invention has been described by way of the preferred embodiment, it should be understood that various modifications, substitutions and alterations will occur to those of skill in the art without departing from the spirit or scope of the invention as defined by the appended claims.

What is claimed is:

1. A method for detecting a similarity between a target data sequence and one or more data sequences stored in a database comprising the steps of:

retrieving a subset of the stored sequences based on the target sequence and an indexing technique, wherein each of said stored sequences and said target sequence have a numerical value, and wherein each of said stored sequences and said target sequence are stored in a feature space;

correlating, based on the numerical values, between said target sequence and said one or more stored sequences at a first level of a predetermined hierarchy in said feature space;

testing a result of said correlating step against a predetermined threshold value;

declaring a match between said target sequence and said one or more stored sequences if said result of said correlating step is greater than said predetermined threshold value.

2. A method, for detecting a similarity between a target data sequence and one or more data sequences stored in a database, according to claim 1, further comprising the step of:

repeating said steps of correlating and testing at a next level of said predetermined hierarchy in said feature space if a match is not declared as a result of said testing step executed at a previous level of said predetermined hierarchy.

3. A method for constructing a representation of a database of sequences for detecting a similarity, comprising the steps of:

applying a feature extraction function to each of a plurality of stored objects in said database, to create a sequence with reduced dimensions;

extracting subsequences having less than a predetermined level of overlapping from the original sequence;

normalizing each extracted subsequence;

computing metadata for each extacted subsequence;

transforming said normalized subsequences; and compressing coefficients of said transformed normalized subsequences.

4. A method for constructing a representation of a database of sequences for detecting a similarity according to claim 3, further comprising the step of:

determining a grouping of said coefficients based on a target sequence.

5. A method for constructing a representation of a database of sequences for detecting a similarity according to claim 3, further comprising the step of:

determining relative importance value for each group of coefficients based on a target sequence.

6. A method for constructing a representation according to claim 3, further comprising the steps of:

normalizing said target sequence;

transforming said normalized target sequence;

applying a transformed domain convolution between said target sequence and said sequences stored in said database in a feature space; and pruning a set of sequences such that said set of sequences are selected only when the maximum value of the convolution result in a level of the hierarchy is above a predetermined threshold.

7. A method for correlating between a target data sequence and one or more data sequences stored in a database, comprising the steps of:

transforming said target sequence into a feature space to generate a first set of coefficients representing said target data sequence in said feature space;

computing a first characteristic for each group in a plurality of groups in said target data sequence and said one or more stored data sequences; and ordering each said group in order of said first characteristic to maximize the distinction capability of correlation between said target data sequence and said stored sequence.

8. A method according to claim 7 wherein said first characteristic is a representation of energy within each said group.

9. A method according to claim 7 wherein said first characteristic is a measure of variance of each said group.

\* \* \* \* \*